United States Patent
Masui et al.

(10) Patent No.: US 12,174,291 B2
(45) Date of Patent: Dec. 24, 2024

(54) OBJECT DETERMINATION APPARATUS

(71) Applicants: DENSO CORPORATION, Kariya (JP); TOYOTA JIDOSHA KABUSHIKI KAISHA, Toyota (JP)

(72) Inventors: Yohei Masui, Kariya (JP); Naoki Kusumoto, Okazaki (JP); Hiroshi Yamada, Nisshin (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 477 days.

(21) Appl. No.: 17/388,960

(22) Filed: Jul. 29, 2021

(65) Prior Publication Data

US 2021/0357709 A1 Nov. 18, 2021

Related U.S. Application Data

(63) Continuation of application No. PCT/JP2020/001929, filed on Jan. 21, 2020.

(30) Foreign Application Priority Data

Jan. 31, 2019 (JP) ................................ 2019-016492

(51) Int. Cl.
*G01S 13/86* (2006.01)
*G01S 13/04* (2006.01)
(Continued)

(52) U.S. Cl.
CPC ............ *G01S 13/867* (2013.01); *G01S 13/04* (2013.01); *G01S 13/931* (2013.01); *G01V 3/12* (2013.01);
(Continued)

(58) Field of Classification Search
CPC ...... G01S 13/867; G01S 13/04; G01S 13/931; G06V 20/58; G06V 20/584; G06V 10/811; G06F 18/256; G06F 18/2415; G08G 1/16
See application file for complete search history.

(56) References Cited

U.S. PATENT DOCUMENTS 9,582,886 B2 * 2/2017 Sasabuchi ............ G06V 40/103
10,613,212 B2 * 4/2020 Hong ...................... G01S 13/72
(Continued)

FOREIGN PATENT DOCUMENTS

JP 2017-211249 A 11/2017

OTHER PUBLICATIONS

Wu, Shunguang, et al. "Collision sensing by stereo vision and radar sensor fusion." IEEE Transactions on Intelligent Transportation Systems 10.4 (2009): 606-614.*

*Primary Examiner* — Shefali D Goradia
(74) *Attorney, Agent, or Firm* — MASCHOFF BRENNAN

(57) ABSTRACT

In an object determination apparatus, a same-object determiner is configured to make a same-object determination as to whether a first object ahead of a subject vehicle that is a vehicle carrying the object determination apparatus, detected by an electromagnetic wave sensor, and a second object ahead of the subject vehicle, detected by an image sensor, are the same object. A candidate-object identifier is configured to identify a candidate for the first object, between which and the second object the same-object determination is to be made, as a candidate object. A candidate-object selector is configured to, in response to there being a plurality of the candidate objects, preferentially select, from the plurality of candidate objects, a candidate object whose likelihood for the identified object type of the second object (Continued)

is higher than a predetermined likelihood threshold, as a candidate object to be subjected to the same-object determination.

10 Claims, 7 Drawing Sheets

(51) Int. Cl.
| | |
|---|---|
| *G01S 13/931* | (2020.01) |
| *G01V 3/12* | (2006.01) |
| *G06F 18/2415* | (2023.01) |
| *G06F 18/25* | (2023.01) |
| *G06V 10/80* | (2022.01) |
| *G06V 20/58* | (2022.01) |
| *G01V 8/00* | (2006.01) |
| *G01V 11/00* | (2006.01) |
| *G08G 1/16* | (2006.01) |

(52) U.S. Cl.
CPC ........ *G06F 18/2415* (2023.01); *G06F 18/256* (2023.01); *G06V 10/811* (2022.01); *G06V 20/58* (2022.01); *G06V 20/584* (2022.01); *G01V 8/005* (2013.01); *G01V 11/00* (2013.01); *G08G 1/16* (2013.01)

(56) References Cited

U.S. PATENT DOCUMENTS

| | | | |
|---|---|---|---|
| 2014/0139369 A1* | 5/2014 | Baba | G01S 13/50 |
| | | | 342/146 |
| 2018/0261094 A1* | 9/2018 | Nishimura | G08G 1/16 |
| 2019/0293787 A1 | 9/2019 | Sakai et al. | |

* cited by examiner

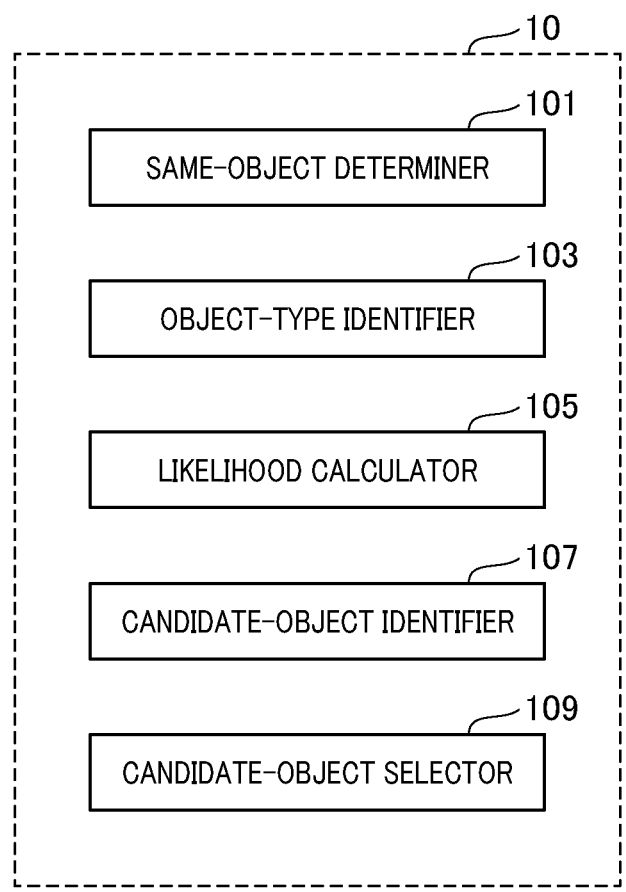

OBJECT DETERMINATION APPARATUS

CROSS-REFERENCE TO RELATED APPLICATION

This application is based on Japanese Application No. 2019-016492 filed on Jan. 31, 2019, the contents of which are incorporated herein by reference.

BACKGROUND

Technical Field

This disclosure relates to an object determination apparatus for determining whether an object detected by an electromagnetic wave sensor and an object detected by an image sensor are the same object.

Related Art

An object determination apparatus is known that determines whether an object detected by an electromagnetic wave sensor configured to transmit and receive electromagnetic waves and an object detected by an image sensor are the same object. This object determination apparatus determines the presence or absence of an overlap between a search region based on a position of the object detected by the electromagnetic wave sensor and a search region based on a position of the object detected by the image sensor, thereby determining whether the object detected by the electromagnetic wave sensor and the object detected by the image sensor are the same object.

BRIEF DESCRIPTION OF THE DRAWINGS

In the accompanying drawings:

FIG. 1B is a functional block diagram of an ECU;

DESCRIPTION OF SPECIFIC EMBODIMENTS

Figure 1A:
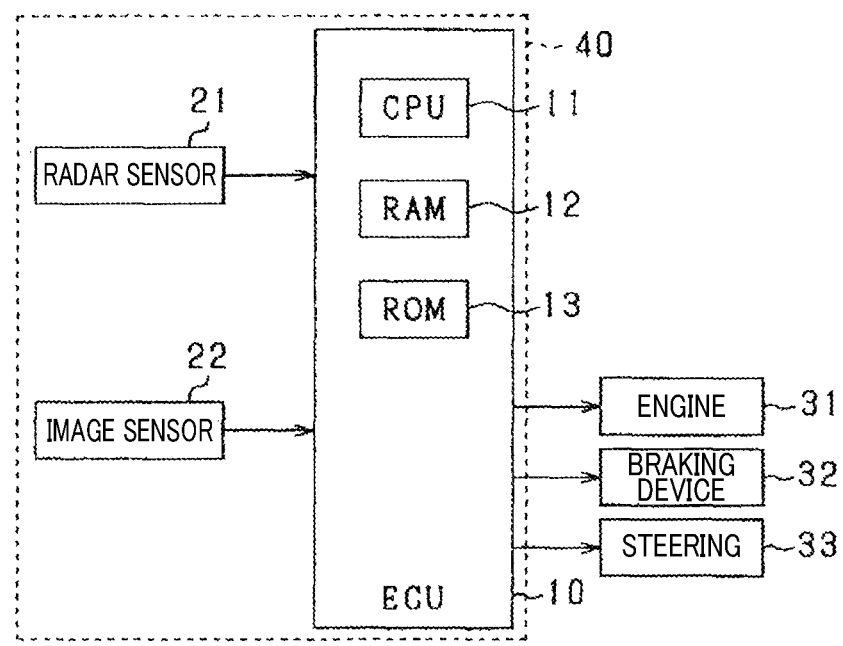
FIG. 1A is a schematic diagram of a driving assistance apparatus according to a first embodiment.

In the known object determination apparatus, as disclosed in JP-A-2017-211249, when a plurality of objects are in proximity ahead of a subject vehicle that is a vehicle carrying the object determination apparatus, the search areas based on positions of the respective objects may be set in proximity to each other. In particular, when the plurality of objects having different positions in the height direction are in proximity, the search regions based on the positions of the respective objects detected by the electromagnetic wave sensor may be set in proximity to each other. In such a case, there is a concern about a false determination of a combination of the object detected by the electromagnetic wave sensor and the object detected by the image sensor.

In view of the above, it is desired to have an object determination apparatus for determining whether an object detected by an electromagnetic wave sensor and an object detected by an image sensor are the same object, which is capable of inhibiting false same-object determinations.

One aspect of the disclosure provides an object determination apparatus. In this object determination apparatus, a same-object determiner is configured to make a same-object determination as to whether a first object ahead of a subject vehicle that is a vehicle carrying the object determination apparatus, detected by an electromagnetic wave sensor operable to transmit and receive electromagnetic waves, and a second object ahead of the subject vehicle, detected by an image sensor are the same object. An object-type identifier is configured to identify an object type of the second object. A likelihood calculator is configured to calculate a likelihood for each object type based on detection information relating to the first object from the electromagnetic wave sensor. A candidate-object identifier is configured to identify a candidate for the first object, between which and the second object the same-object determination is to be made by the same-object determiner, as a candidate object. A candidate-object selector is configured to, in response to there being a plurality of the candidate objects, preferentially select, from the plurality of candidate objects, a candidate object whose likelihood for the identified object type of the second object is higher than a predetermined likelihood threshold, as a candidate object to be subjected to the same-object determination by the same-object determiner.

When there are a plurality of candidate objects, between each of which and the second object the same-object determination is to be made, the likelihood of each of the plurality of candidate objects, for each of a plurality of object types, is calculated based on the detection information from the electromagnetic wave sensor. A candidate object, among the plurality of candidate objects, whose likelihood for the identified object type of the second object is higher than a predetermined likelihood threshold is preferentially selected as a candidate object to be subjected to same-object determination by the same-object determiner. Therefore, even if there are a plurality of candidate objects, between each of which and the second object the same-object determination is to be made, a candidate object of the same type as the second object, among the plurality of candidate objects, is allowed be preferentially selected as a candidate object to be subjected to same-object determination. This can inhibit a false determination that the first object and the second object are the same object despite them being different objects.

FIRST EMBODIMENT

Hereinafter, a driving assistance apparatus according to a first embodiment will be described with reference to the accompanying drawings. The driving assistance apparatus is mounted to a vehicle, and performs adaptive cruise control (ACC) in which a distance to a preceding vehicle is controlled to a target value of distance depending on a vehicle speed. The vehicle carrying the driving assistance apparatus will be referred to as a subject vehicle.

The driving assistance apparatus 40 illustrated in FIG. 1A includes an electronic control unit (ECU) 10 as an object determination apparatus, a radar sensor 21, and an image sensor 22.

The radar sensor 21 is, for example, a well-known millimeter-wave radar that transmits radio-frequency signals in a millimeter waveband as transmitted waves. The radar sensor 21 is installed at the front end of the subject vehicle to detect a first position P1 that is a position of an object within a detection range. The detection range refers to a region within a predefined detection angle, objects within which can be detected. More specifically, the radar sensor 21 transmits a probe wave every predetermined time interval and receives a reflected wave of the probe wave via a plurality of antennas, and calculates a first relative distance from the subject vehicle to a target in the X-Y plane relative to the subject vehicle based on the probe wave transmission time and the reflected wave reception time. The radar sensor 21 further calculates a first azimuth angle of the object in the X-Y plane based on a phase difference between the reflected waves received at the plurality of antennas. The X-Y plane is a plane with the X-axis along a lateral direction of the subject vehicle and the Y-axis along a longitudinal direction (or a travel direction) of the subject vehicle. The radar sensor 21 detects the first position P1 of the object indicated by the calculated first relative distance D1 and first azimuth θ1. The radar sensor 21 calculates a relative speed of the object relative to the subject vehicle based on a change in frequency of the reflected wave from the radar target, caused by the Doppler effect.

In the following, the object having the first position P1 detected by the radar sensor 21 is referred to as a radar target. The radar target corresponds to a first object.

The imaging sensor 22 is installed at a lateral center of the subject vehicle and at a predetermined height. The imaging sensor 22 captures an image of a region that horizontally spans a predefined range of angles from a forward-looking imaging axis of the camera and performs pattern matching with predefined target templates based on degrees of luminance within the captured image. This pattern matching allows an area in the captured image having luminance information matching a specific target template to be recognized as an object corresponding to the specific target template. The image sensor 22 calculates the center of the object in the X-direction as the X-axis position of the object. A width along the X axis (hereinafter referred to as an X-axis width) of the object in the captured image increases as the object is closer to the image sensor 22. Therefore, the image sensor 22 calculates the Y-coordinate of the object based on the width of the object. Then, the image sensor 22 calculates, as a second position P2 of the position, a second relative distance D2 from the subject vehicle to the object and a second azimuth θ2 of the object relative to the subject vehicle from the calculated X- and Y-coordinates of the object.

In the following, the object having the second position P2 detected by the image sensor 22 is referred to as an image target. The image target corresponds to a second object.

The image sensor 22 identifies the type of image target from the matched target template. In the present embodiment, the image sensor 22 classifies types of image targets into vehicles, road signs, and pedestrians. The vehicles include motorcycles, passenger cars (small- and medium-sized vehicles), and trucks (large-sized vehicles). The road signs include traffic lights. In the present embodiment, the road signs correspond to on-road stationary objects installed in a height range different from a vehicle height range.

The position P1 detected by the radar sensor 21 and the second position P2 detected by the image sensor 22 are input to the ECU 10. The ECU 10 is a computer (or a microcomputer) formed of a central processing unit (CPU) 11, a random-access memory (RAM) 12, a read-only memory (ROM) 13, an input/output interface (I/O) and the like.

As illustrated in FIG. 1B, the ECU 10 includes, as functional blocks implemented by executing programs stored in the ROM or the like, a same-object determiner 101, an object-type identifier 103, a likelihood calculator 105, a candidate-object identifier 107, and a candidate-object selector 109.

The ECU 10 makes a determination as to whether the radar target and the image target are the same object (hereinafter referred to as a same-object determination). More specifically, the ECU 10 determines whether the radar target and the image target are the same object, based on the presence or absence of an overlap between the radar search region A1 based on the first position P1 of the radar target and the image search region A2 based on the second position P2 of the image target. When the ECU 10 determines that there is an overlap between the radar search region A1 and the image search region A2, the ECU 10 determines that the radar target and the image target are the same target. When there is no overlap between the radar search region A1 and the image search region A2, the ECU 10 determines that the radar target and the image target are different targets. In the present embodiment, the ECU 10 corresponds to the same-object determiner 101 illustrated in FIG. 1B. The radar search region A1 corresponds to a first search region, and the image search region A2 corresponds to a second search region.

Figure 2:
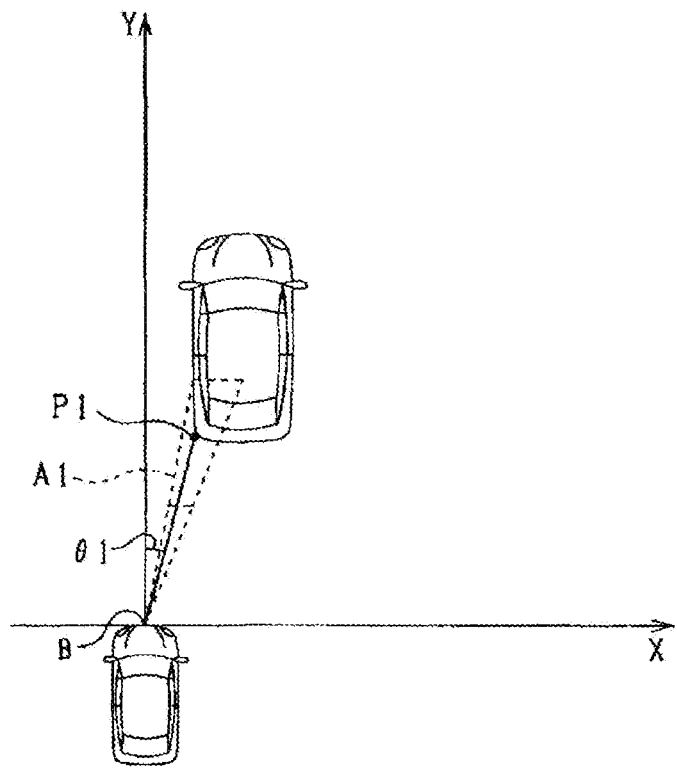
FIG. 2 is an illustration of setting a radar search region.

As illustrated in FIG. 2, the radar search region A1 includes a first position P1 and is a region in the XY-plane where it is assumed that there is a radar target. In the present embodiment, the ECU 10 sets a width along the Y axis (hereinafter referred to as a Y-axis width) of the radar search region A1 to an assumed error that is previously assumed based on the characteristics of the radar sensor 21 and sets an angular width around a first azimuth θ1 from the origin B at the subject vehicle in the XY-plane, to an assumed error that is previously assumed based on the characteristics of the radar sensor 21. The demarcated region is set as the radar search region A1.

Figure 3:
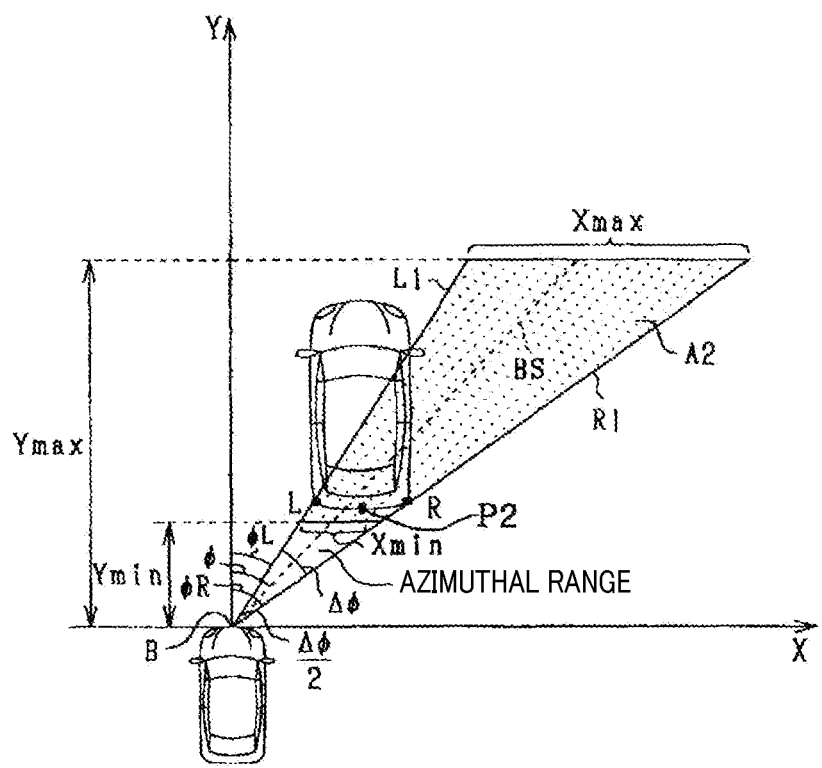
FIG. 3 is an illustration of setting an image search region.

As illustrated in FIG. 3, the image search region A2 includes a second position P2 and is a region in the XY-plane where it is assumed that there is an image target having the second position P2 detected. In the present embodiment, the ECU 10 calculates a Y-coordinate corresponding to an assumed width minimum Xmin that is a width minimum in the X-axis direction assumed for the type of the image target, where the calculated Y-coordinate is referred to as a Y-axis minimum Ymin. The ECU 10 calculates a Y-coordinate corresponding to an assumed width maximum Xmax that is a width maximum in the X-axis direction assumed for the type of the image target, where the calculated Y-coordinate is referred to as a Y-axis maximum Ymax. A range of the image search region A2 in the Y-axis direction ranges from the Y-axis minimum Ymin to the Y-axis maximum Ymax.

The ECU 10 calculates an azimuth range that is defined by azimuths to the left edge L and to the right edge R of the image target in the X-axis direction relative to the travel direction of the subject vehicle. This azimuth range in the XY-plane is calculated from the azimuth to the left edge L of the image target and the azimuth to the right edge R of the image target in the captured image. The Y-axis minimum Ymin at which a width along the X-axis of the calculated azimuthal range is equal to the assumed width minimum Xmin and the Y-axis maximum Ymax at which a width along the X-axis of the calculated azimuthal range is equal to the assumed width maximum Xmax are calculated. The image search region A2 is set to a subrange of the azimuthal range from the calculated Y-axis minimum Ymin to the calculated Y-axis maximum Ymax along the Y-axis (hereinafter referred to as a Y-axis range), as indicated by hatching. A specific method of setting the image search region A2 will be described later.

The ECU 10 fuses information of the radar target and the image target that are determined as the same object and thereby sets a fusion target as a new target. The radar sensor 21 has a higher accuracy of detecting a distance to an object than the image sensor 22 while the image sensor 22 has a higher accuracy of detecting a lateral position and an azimuth of the object than the radar sensor 21. Therefore, the ECU 10 sets detection information of the fusion target by combining relatively accurate ones of values detected by the radar sensor 21 and the image sensor 22.

The ECU 10 transmits a control command to an engine 31 and a braking device 32 to keep a target following distance between the subject vehicle and a preceding target, among fusion targets, traveling in the lane in which the subject vehicle is traveling. The target following distance changes with the speed of the subject vehicle. A lane change may be made by a driver of the subject vehicle operating the steering 33. In this case as well, as in the case of automatic steering, the ECU 10 transmits a control command to the engine 31 and the braking device 32 such that a distance between the subject vehicle and a new target to be followed becomes the target following distance. If there is no preceding vehicle traveling in the lane in which the subject vehicle is traveling, travel speed control may be performed based on the travel speed set by the driver, a speed limit for the road on which the subject vehicle is traveling, and the like.

Figure 4A:
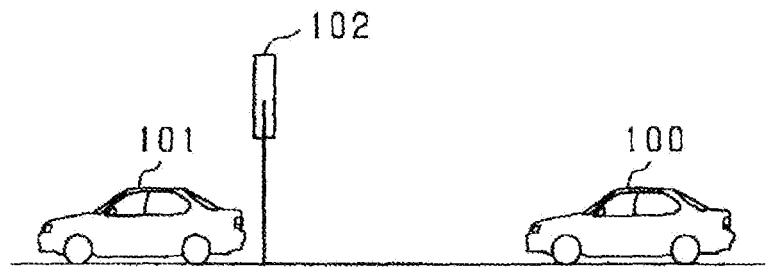
FIGS. 4A and 4B are a scene where a preceding vehicle is traveling ahead of a subject vehicle carrying the driving assistance apparatus.
Figure 4B:
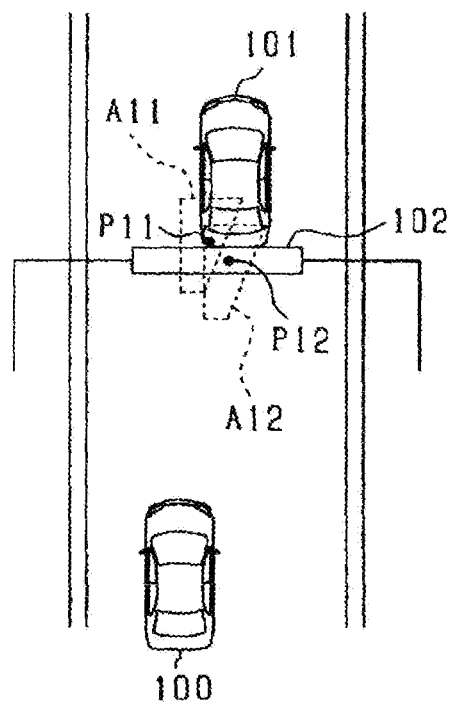

FIGS. 4A and 4B are views illustrating a scene in which a preceding vehicle is traveling ahead of the subject vehicle and a road sign 102 is installed, between the subject vehicle 100 and the presenting vehicle 101, at a position higher than the subject vehicle 100. FIG. 4A is a side view illustrating the subject vehicle 100, the presenting vehicle 101, and the road sign 102. FIG. 4B is a top view illustrating the subject vehicle 100, the presenting vehicle 101, and the road sign 102.

In the scene illustrated in FIGS. 4A and 4B, the first position P11 of the preceding vehicle 101 and the first position P12 of the road sign 102 detected by the radar sensor 21 are in proximity in the XY-plane. Therefore, the ECU 10 sets the radar search region A11 based on the first position P11 of the preceding vehicle 101 and the radar search region A12 based on the first position P12 of the road sign in proximity in the XY-coordinate plane. In such a case where there is an overlap between the image search region A2 based on the second position P2 of the preceding vehicle 101 and the radar search region A12 based on the first position P12 of the road sign 102, there is a risk that the ECU 10 may make an incorrect determination that the combination of the preceding vehicle and the road sign are the same object.

To address such an issue, when there is a plurality of candidate objects for a radar target, between which and an image target a same-object determination is to be made, the ECU 10 calculate, for each of the plurality of candidate objects, a likelihood Li that the candidate object is of the image-target type of the image target. The ECU 10 preferentially selects, from the plurality of candidate objects, a candidate object having a high likelihood Li as a candidate object to be subjected to same-object determination. The likelihood Li is an indicator indicating how likely the radar target is of the image-target type of the image target. The likelihood Li takes a value, for example, between 0 and 100. The higher the likelihood Li for a certain image-target type, the higher the likelihood that the radar target is of this certain image-target type. In the following, the image target to be subjected to same-object determination will be referred to as a subject image target.

Various functions of the ECU 10 will now be described.

The ECU 10 identifies the image-target type of the subject image target based on detection information from the image sensor 22. In the present embodiment, the ECU 10 corresponds to the object-type identifier 103 illustrated in FIG. 1B.

The ECU 10 identifies a radar target, among the radar targets, located in the same azimuth range as the subject image target, as a candidate object. More specifically, a radar target with an absolute value of angle difference between a first azimuth θ1 thereof and a second azimuth θ2 of the subject image target falling within a predetermined angle range is identified as a candidate object. In the present embodiment, the ECU 10 corresponds to the candidate-object identifier 107 illustrated in FIG. 1B.

Figure 5:
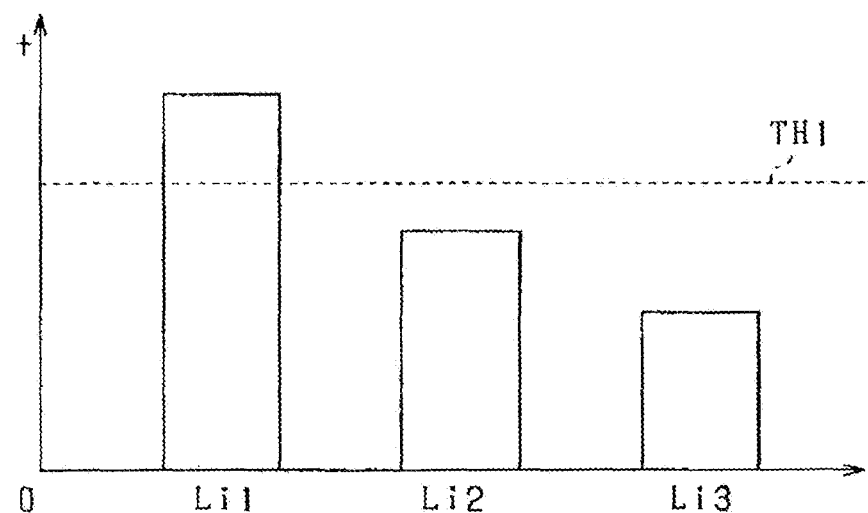
FIG. 5 is an illustration of likelihoods for respective image-target types.

The ECU 10 calculates, for the identified candidate object, the likelihood Li for each of the image-target types based on the detection information from the radar sensor 21. In the present embodiment, the image-target types include a vehicle, a road sign, and a pedestrian. Therefore, as illustrated in FIG. 5, the ECU 10 calculates, for the identified candidate object, a vehicle likelihood Li1 which is a likelihood of being a vehicle, a road-sign likelihood Li2 which is a likelihood of being a road sign, and a pedestrian likelihood Li3 which is a likelihood of being a pedestrian.

In response to the detection information from the radar sensor 21, the ECU 10 acquires likelihood additional values ΔL1 to ΔL3 that are additional values to be added to the likelihoods Li for the respective object types, and adds the acquired likelihood additional values ΔL1 to ΔL3 to the respectively corresponding likelihoods Li1 to Li3, thereby calculating the likelihoods Li1 to Li3 for the respective image-target types. More specifically, the ECU 10 adds the vehicle additional value ΔL1 to the vehicle likelihood Li1, thereby calculating or updating the vehicle likelihood Li1. The ECU 10 adds the road-sign additional value ΔL2 to the road-sign likelihood Li2, thereby calculating the road-sign likelihood Li2. The ECU 10 adds the pedestrian additional value ΔL3 to the pedestrian likelihood Li3, thereby calculating the pedestrian likelihood Li3. The likelihood additional values ΔL1 to ΔL3 differ according to the contents of the detection information. In the present embodiment, the ECU 10 corresponds to the likelihood calculator 105 illustrated in FIG. 1B.

In the present embodiment, the ECU 10 acquires the following three pieces of information as detection information: (i) an absolute speed of the candidate object; (ii) an amount of change in received strength of the reflected wave at the radar sensor 21 as the subject vehicle approaches the candidate object; and (iii) the received strength of the reflected wave from the candidate object at the radar sensor 21.

The absolute speed of the vehicle is higher than the absolute speed of the pedestrian, and the absolute speed of the pedestrian is higher than the absolute speed of the road sign. Therefore, the ECU 10 acquires, as the detection information, an absolute speed of the radar target detected by the radar sensor 21 that is the relative speed of the radar target plus the speed of the subject vehicle. The vehicle additional value ΔL1 for a candidate object, among the candidate objects, whose absolute speed is higher than a predetermined speed threshold is set higher than the vehicle additional value for a candidate object, among the candidate objects, whose absolute speed is equal to or lower than the predetermined speed threshold. The predetermined speed threshold may be any speed as long as it can distinguish between vehicles and pedestrians that are moving objects and, may be equal to or higher than 30 km/h.

Figure 6A:
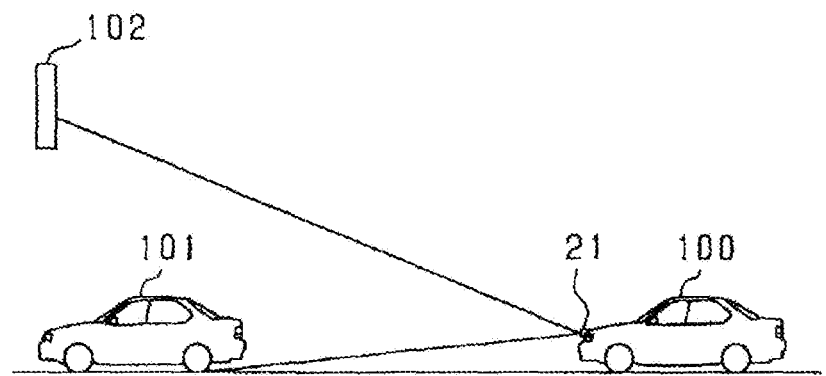
FIGS. 6A and 6B are an illustration of how to calculate likelihood additional values.
Figure 6B:
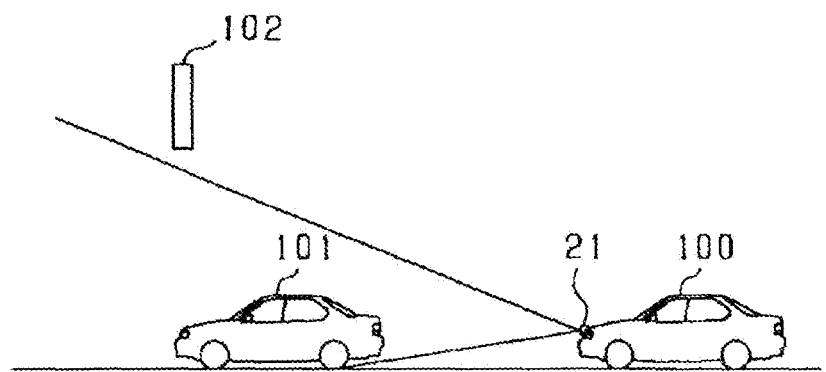

FIGS. 6A and 6B illustrate a preceding vehicle 101 and a road sign 102 both present ahead of the subject vehicle. It is assumed that the preceding vehicle 101 is stationary and the scene in FIG. 6A is temporally before the scene in FIG. 6B. Since the preceding vehicle 101 has a small height difference from the subject vehicle 100, the preceding vehicle 101 will not depart from a detection range (emission width) in the vertical direction of the radar sensor 21 even if the subject vehicle 100 approaches the preceding vehicle 10. On the other hand, the road sign 102 having a large height difference as compared with the subject vehicle 100 will depart from the detection range in the vertical direction of the radar sensor 21 as the subject vehicle 100 approaches the road sign. Therefore, at the radar sensor 21, the amount of change in the received strength from the road sign may change more than the amount of change in the received strength from the preceding vehicle. Thus, the ECU 10 acquires, as detection information, an amount of change in the received strength at the radar sensor 21 when the subject vehicle approaches the candidate object. More specifically, the ECU 10 acquires, as detection information, an amount of change in the received strength while the subject vehicle travels for a predetermined period of time or while the subject vehicle travels a predetermined distance. For a candidate object, among the candidate objects, whose amount of change in the received strength is greater than a predetermined amount-of-change threshold, the road-sign additional value ΔL2 is set higher than the road-sign additional value for a candidate object, among the candidate objects, whose amount of change in the received strength is equal to or less than the predetermined amount-of-change threshold. Alternatively, for a candidate object, among the candidate objects, whose amount of change in the received strength is equal to or less than a predetermined amount-of-change threshold, the vehicle additional value ΔL1 may be set higher than the vehicle additional value for a candidate object, among the candidate objects, whose amount of change in the received strength is greater than the predetermined amount-of-change threshold.

At the radar sensor 21, the received strength of the reflected wave from any one of the vehicle and the road sign is higher than the received strength of the reflected wave from the pedestrian. Therefore, the ECU 10 acquires the received strength at the radar sensor 21 as detection information. For a candidate object, among the candidate objects, whose received strength is higher than a predetermined strength threshold, the vehicle additional value ΔL1 and the signed additional value ΔL2 are increased. The predetermined strength threshold may be defined as the received strength at the radar sensor 21 that allows for distinguishing the vehicle and the road sign from the pedestrian.

The ECU 10 selects, from the candidate objects, a candidate object having a likelihood Li for the image-target type of the subject image target higher than a predetermined likelihood threshold TH1, as a candidate object to be subjected to same-object determination. Among the likelihoods Li illustrated in FIG. 5, the vehicle likelihood Li1 is higher than the likelihood threshold TH1. Therefore, in a case where the image-target type of the subject image target is the vehicle, the candidate object having the vehicle likelihood Li1 illustrated in FIG. 5 is selected as a candidate object to be subjected to same-object determination. Given that the likelihood Li takes a value in the range from 0 to 100, the likelihood threshold TH1 may be set equal to or greater than 80, preferably set equal to or greater than 90. In the present embodiment, the ECU 10 corresponds to the candidate-object selector 109 illustrated in FIG. 1B.

Figure 7:
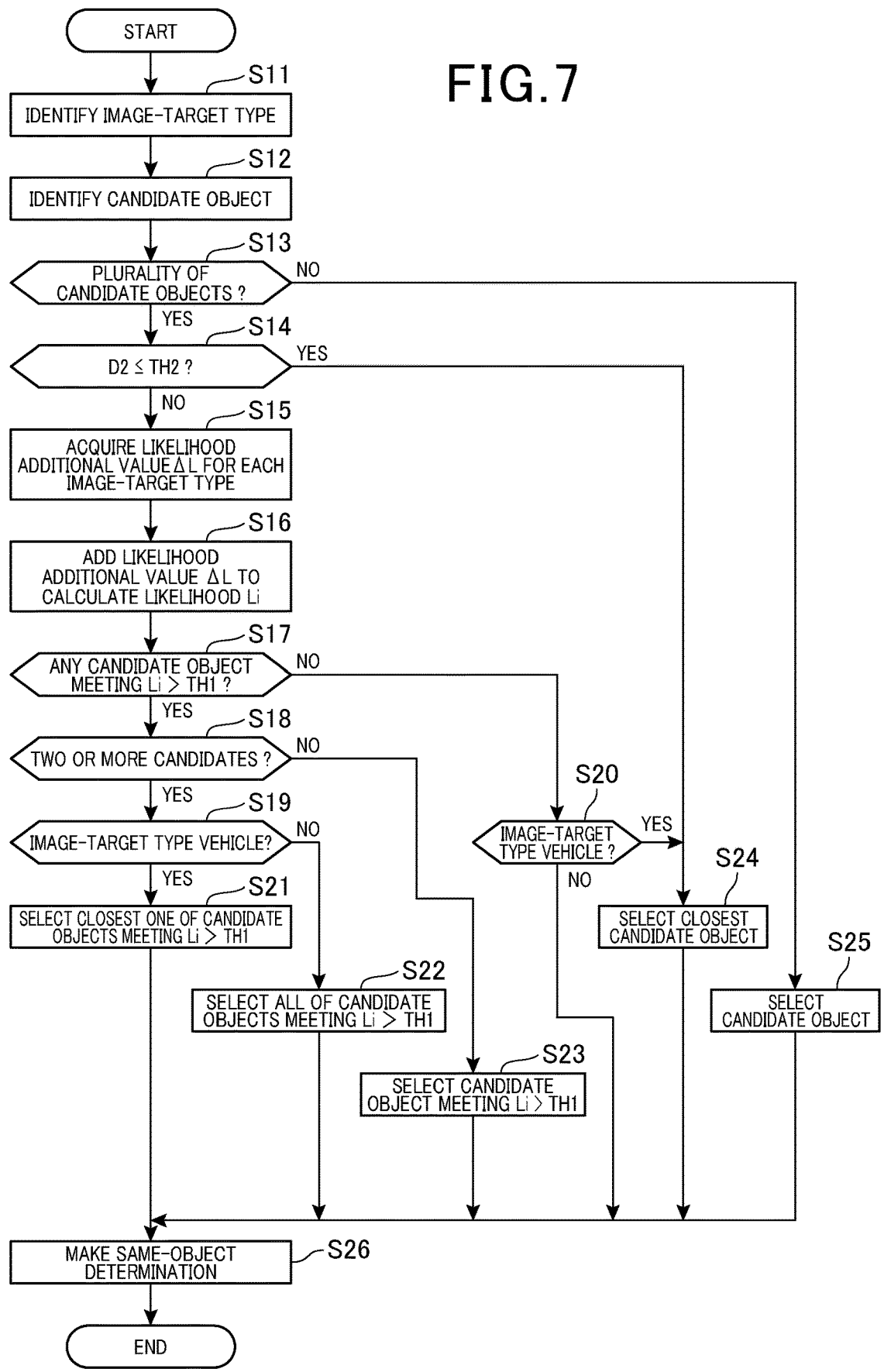
FIG. 7 is a flowchart of a same-object determination process.

The same-object determination process according to the present embodiment will now be described with reference to FIG. 7. The process illustrated in FIG. 7 is repeatedly performed by the ECU 10 with a predefined control periodicity.

At step S11, the ECU 10 identifies the image-target type of the subject image target based on the image-target type output from the image sensor 22.

At step S12, the ECU 10 identifies, among the radar targets, a radar target with an absolute value of angle difference between a first azimuth θ1 thereof and a second azimuth θ2 of the subject image target falling within the predetermined angle range, as a candidate object.

At step S13, the ECU 10 determines whether there are a plurality of candidate objects each identified as a candidate object at step S12. If there is only one candidate object, the process flow proceeds to step S25. At step S25, the ECU 10 selects the only one candidate object as a candidate object to be subjected to same-object determination. At step S26, the ECU 10 makes a same-object determination between the subject image target and the candidate object. When proceeding from step S25 to step S26, the same-object determination between the subject image target and the candidate object is made based on whether there is an overlap between the search region A1 based on the candidate object and the search region A2 based on the subject image target.

If at step S13 it is determined that there are a plurality of candidate objects, the process flow proceeds to step S14. In a case where the subject image target is a nearby object located in proximity to the subject vehicle, the closest one of the candidate objects to the subject vehicle is likely to be the same object as the image target. At step S14, the ECU 10 determines whether the second relative distance D2 of the subject image target is equal to or less than a predetermined nearby distance TH2. If it is determined that the second relative distance D2 of the subject image target is equal to or less than the predetermined nearby distance TH2, the subject image target is a nearby object. The process flow then proceeds to step S24. At step S24, the ECU 10 selects, the closest one of the candidate objects to the subject vehicle is selected as a candidate object to be subjected to same-object determination. A distance from the subject vehicle to each candidate object may be determined using the first relative distance D1 from the subject vehicle to the first position P1.

The nearby distance TH2 may be set to a value which depends on the target following distance set in, for example, the adaptive cruise control (ACC). In this case, the value of nearby distance TH2 may be determined according to the relative speed of the subject image target relative to the speed of the subject vehicle. More specifically, the higher the relative speed of the subject image target, the larger the nearby distance TH2, and the lower the relative speed, the smaller the nearby distance TH2.

At step S14, if it is determined that the subject image target is not a nearby object, then at step S15 the ECU 10 acquires the likelihood additional value ΔL for each image-target type based on detection information relating to each candidate object. More specifically, the ECU 10 uses the absolute speed, the amount of change in the received strength at the radar sensor 21, and the received strength at the radar sensor 21 for each candidate object to acquire the vehicle additional value ΔL1, the road-sign additional value ΔL2, and the pedestrian additional value ΔL3.

At step S16, the ECU 10 adds the likelihood additional values ΔL1 to ΔL3 acquired based on the detection information at step S15 to the respectively corresponding image-target type likelihoods Li, thereby calculating the three likelihoods, that is, the vehicle likelihood Li1, the road-sign likelihood Li2, and the pedestrian likelihood Li3.

At step S17, the ECU 10 determines whether there is at least one object, among the candidate objects identified at step S12, whose likelihood Li for the image-target type of the subject image target is higher than the likelihood threshold TH1. If the answer is "YES" at step S17, then at step S18 the ECU 10 determines whether there are a plurality of candidate objects, among the candidate objects identified at step S12, whose likelihood Li is higher than the likelihood threshold TH1. If at step S18 it is determined that there are a plurality of candidate objects, among the candidate objects identified at step S12, whose likelihood Li higher than the likelihood threshold TH1, the process flow proceeds to step S19.

In a scene where a plurality of vehicles are traveling ahead of the subject vehicle, the image sensor 22 may detect only the vehicle closer to the subject vehicle since a forward vehicle may be hidden by a rearward vehicle in the captured image. On the other hand, the radar sensor 21 can detect the respective vehicles traveling since the millimeter waves can pass through a clearance between the rearward vehicle and a surface of the road. In this case, a candidate object, among the candidate objects determined at S18, closest to the subject vehicle is more likely to be the subject image target.

At step S19, the ECU 10 determines whether the image-target type of the subject image target is the vehicle. If it is determined that the image-target type is the vehicle, the process flow proceeds to step S21, where the ECU 10 selects, from the candidate objects having the likelihood Li for the image-target type of the subject image target higher than the predetermined likelihood threshold TH1, a candidate object closest in distance to the subject vehicle, as a candidate object to be subjected to same-object determination. At step S26 subsequent to step S21, a same-object determination is made between the subject image target and the candidate object selected at step S21 based on the presence or absence of an overlap between the search regions A1 and A2.

If at step S19 it is determined that the image-target type of the subject image target is not the vehicle, the process flow proceeds to step S22. At step S22, all of the candidate objects, among the candidate objects identified at step S12, whose likelihood Li for the image-target type of the subject image target is higher than the likelihood threshold TH1 are selected as a candidate object to be subjected to same-object determination. At step S26 subsequent to step S22, a same-object determination is made between the subject image target and each of the candidate objects selected at step S22 based on the presence or absence of an overlap between the search regions A1 and A2.

If at step S18 it is determined that there is only one candidate object whose likelihood Li for the image-target type of the subject image target is higher than the likelihood threshold TH1, the process flow proceeds to step S23, where the candidate object whose likelihood Li for the image-target type of the subject image target is higher than the likelihood threshold TH1 is selected as a candidate object to be subjected to same-object determination. At step S26 subsequent to step S23, a same-object determination is made between the subject image target and the candidate object selected at step S23 based on the presence or absence of an overlap between the search regions A1 and A2.

If at step S17 it is determined that there is not any candidate object whose likelihood Li for the image-target type of the subject image target is higher than the likelihood threshold TH1, the process flow proceeds to step S20. At step S20, the ECU 10 determines whether the image-target type of the subject image target is the vehicle. If it is determined that the image-target type is the vehicle, the process flow proceeds to step S24, where the ECU 10 selects, from the candidate objects identified at step S12, a candidate object closest in distance to the subject vehicle, as a candidate object to be subjected to same-object determination. At step S26 subsequent to step S24, a same-object determination is made between the subject image target and the candidate object selected at step S24 based on the presence or absence of an overlap between the search regions A1 and A2. If at step S20 it is determined that the image-target type of the subject image target is not the vehicle, the process flow illustrated in FIG. 7 ends.

After completion of step S26, the process flow illustrated in FIG. 7 ends.

A process of setting the image search region A2 according to the present embodiment will now be described.

Regarding the image target, the Y-axis minimum Ymin at which the X-axis width of the azimuthal range is equal to the assumed width minimum Xmin can be calculated using the equation (2). The way to calculate the assumed width minimum Xmin will be described in detail below.

As illustrated in FIG. 3, in the XY-plane, an angle φR between the Y-axis and a virtual line R1 passing through the right edge R of the target and the origin B is detected. In addition, in the XY-plane, an angle φL between the Y-axis and a virtual line L1 passing through the left edge L of the target and the origin B is detected. The tangent of the angle φR is the X-coordinate of the right edge R of the target divided by the Y-coordinate of the right edge R of the target (corresponding to the Y-axis minimum Ymin). That is, the Y-axis minimum Ymin is the X-coordinate of the right edge R of the target divided by the tangent of the angle DR. On the other hand, the X-coordinate of the right edge R of the target corresponds to a sum of the assumed width minimum Xmin and the X-coordinate of the left edge L of the target. The X-coordinate of the left edge L of the target corresponds to a product of the Y-coordinate of the left edge L of the target (corresponding to the Y-axis minimum Ymin) and the tangent of the angle φL. In consideration of the above, the Y-axis minimum Ymin is expressed as follows.

$$Y\text{min} = X\text{min}/(\tan \varphi R - \tan \varphi L) \quad (1)$$

In the present embodiment, an azimuthal range is defined based on the azimuth from origin B to the left edge L of the target and the azimuth from origin B to the right edge R of the target in the XY-plane. The image search region is set within the azimuthal range. Therefore, the Y-axis minimum Ymin is acquired based on the angular width Δφ of the azimuthal range with respect to the origin B.

The detected angle φR minus the detected angle φL corresponds to the angular width Δφ defined by the virtual line R1 and the virtual line L1 originating from the origin B. An angular width Δφ/2 between either of the virtual line R1 and the virtual line L1 defining the azimuthal range and a bisector BS of the angular width Δφ is calculated. Then, an angle φ is calculated by adding the calculated angular width Δφ/2 to the angle φL.

The angle φR is the angle φ plus the angular width Δφ/2, and the angle φL is the angle φ minus the angular width Δφ/2. Therefore, the equation (1) can be rearranged into the following equation (2) which gives the Y-axis minimum Ymin.

$$Ymin=Xmin/\{(\tan(\varphi+\Delta\varphi/2)-\tan(\varphi-\Delta\varphi/2)\} \quad (2)$$

Similarly, the Y-axis maximum Ymax at which a width along the X-axis of the azimuthal range is equal to the assumed width maximum Xmax can be calculated using the following equation (3).

$$Ymax=Xmax/\{(\tan(\varphi+\Delta\varphi/2)-\tan(\varphi-\Delta\varphi/2)\} \quad (3)$$

The image search region A2 is set to a subrange of the azimuthal range from the Y-axis minimum Ymin to the Y-axis maximum Ymax along the Y-axis.

The present embodiment set forth above can provide the following advantages.

(A1) When there are a plurality of candidate objects for a radar target, between each of which and a subject image target a same-object determination is to be made, the ECU 10 calculates, for each of the candidate objects, a likelihood Li for each of a plurality of image-target types based on detection information relating to the candidate object acquired from the radar sensor 21. The ECU 10 selects, from the plurality of candidate objects, a candidate object having the likelihood Li for the image-target type of the subject image target higher than a predetermined likelihood threshold TH1, as a candidate object to be subjected to same-object determination. Therefore, even if there are a plurality of candidate objects for the radar target, a candidate object, among the plurality of candidate objects, which is of the same image-target as the subject image target is preferentially selected as a candidate object to be subjected to same-object determination. This can inhibit a false determination that the radar target and the image target are the same object despite them being different objects.

(A2) Based on the detection information from the radar sensor 21, the ECU 10 acquires likelihood additional values ΔL1 to ΔL3 that are additional values to be added to the likelihoods Li for the respective object types, and adds the acquired likelihood additional values ΔL1 to ΔL3 to the respectively corresponding likelihoods Li1 to Li3, thereby calculating the likelihoods Li1 to Li3 for the respective image-target types. The likelihood additional values ΔL1 to ΔL3 for the respective image-target types differ depending on contents of the detection information, which enables appropriate quantification of the likelihoods Li1 to Li3 for the respective image-target types. This can further inhibit a false determination that the radar target and the image target are the same object despite them being different objects.

(A3) The ECU 10 acquires an absolute speed of the radar target as the detection information, and for a candidate object, among the plurality of candidate objects, whose absolute speed is higher than a predetermined speed threshold, sets a vehicle additional value ΔL1 higher than for a candidate object whose absolute speed is equal to or less than the speed threshold. In a scene where a road sign, which is a stationary object, is disposed above a vehicle that is a moving object, this can inhibit a false determination that the vehicle and the road sign are the same object.

(A4) The ECU 10 acquires an amount of change in the received strength of the reflected wave at the radar sensor 21 as the subject vehicle approaches a candidate object as detection information, and for a candidate object, among the plurality of candidate objects, whose amount of change in the received strength is greater than a predetermined amount-of-change threshold, sets a road-sign additional value ΔL2 higher than for a candidate object whose amount of change in the received strength of the reflected wave at the radar sensor 21 is equal to or less than the predetermined amount-of-change threshold. In a scene where a road sign having a large difference in height from a vehicle is in proximity to the vehicle, this can inhibit a false determination that the vehicle and the road sign are the same object.

(A5) The ECU 10 acquires the received strength of the reflected wave at the radar sensor 21 as detection information, and for a candidate object, among the plurality of candidate objects, whose received strength is higher than a predetermined strength threshold, sets a vehicle additional value ΔL1 higher than for a candidate object whose received strength is equal to or lower than the predetermined strength threshold. This can inhibit a false determination that a vehicle and a pedestrian sign are the same object.

(A6) When the object type of the image target to be subjected to same-object determination as to whether the image target and a radar target are the same object has been identified as the vehicle and there are a plurality of candidate objects for the radar target, each of which has the vehicle likelihood Li1 higher than a likelihood threshold TH1, the ECU 10 preferentially selects, from the plurality of candidate objects, a candidate object closest to the subject vehicle as a candidate object to be subjected to the same-object determination. In a scene where a plurality of vehicles are traveling ahead of the subject vehicle, this can inhibit a false determination that different vehicles are the same object.

(A7) When the object type of the image target to be subjected to same-object determination as to whether the image target and a radar target are the same object has been identified as the vehicle and there is not any candidate object for the radar target having the vehicle likelihood Li1 higher than the likelihood threshold TH1, the ECU 10 preferentially selects, from the plurality of candidate objects, a candidate object closest to the subject vehicle as a candidate object to be subjected to the same-object determination. This makes it possible to determine that the image target and the candidate object closest to the subject vehicle are the same object, even if the vehicle likelihood Li1 is inappropriately calculated.

(A8) For an image target whose distance from the subject vehicle is less than a predetermined nearby distance, the ECU 10 preferentially selects, regardless of the likelihood Li, a candidate object closest to the subject vehicle from the plurality of candidate objects as a candidate object be subjected to same-object determination as to whether the image target and the candidate object are the same object. This makes it possible to determine that the image target and the candidate object closest to the subject vehicle are the same object, even if the vehicle likelihood Li1 is inappropriately calculated.

Second Embodiment

In a second embodiment, only differences from the first embodiment will be described below. The same elements as in the first embodiment are assigned the same reference numbers and duplicated description thereof will be omitted.

Figure 8:
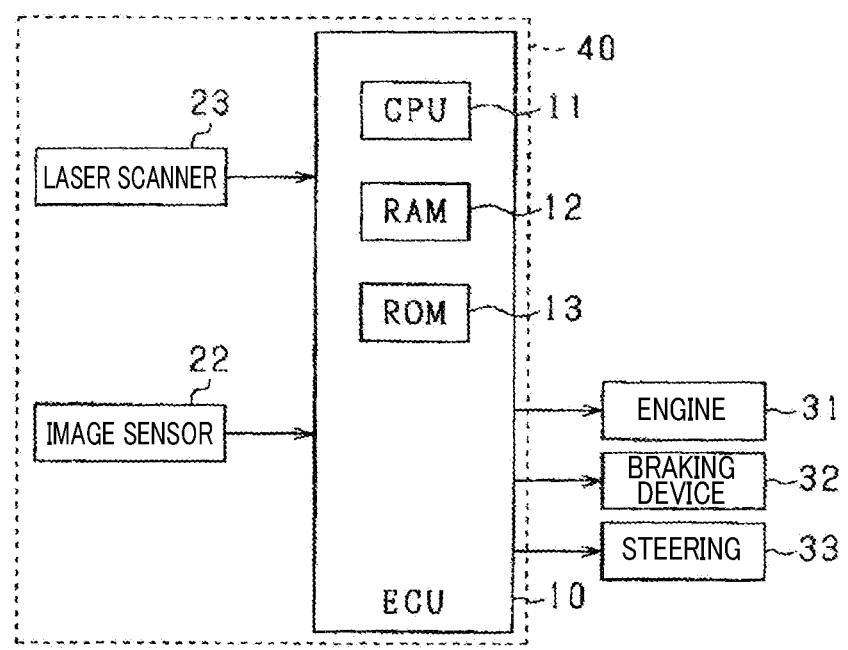
FIG. 8 is a schematic diagram of a driving assistance apparatus according to a second embodiment.

In the present embodiment, as illustrated in FIG. 8, the driving assistance apparatus 40 includes a laser scanner 23 as an electromagnetic wave sensor, instead of the radar sensor. The laser scanner 23 scans, with laser light, a predetermined angle range in front of the subject vehicle and along the horizontal direction of the subject vehicle, and receives the reflected light reflected from an object around the subject vehicle to acquire a distance to the object, an outline shape of the object and the like.

A vehicle traveling ahead of the subject vehicle has a larger dimension in the travel direction of the subject vehicle than a road sign. Therefore, in the present embodiment, the ECU 10 acquires, as detection information, a depth dimension of a radar target in the travel direction of the subject vehicle from an outer dimension detected by the laser scanner 23. In this case, at step S15 illustrated in FIG. 7 for acquiring the vehicle additional value ΔL1, the vehicle additional value ΔL1 may be set greater than each of the road-sign additional value ΔL2 and the pedestrian additional value ΔL3 for the candidate object whose depth dimension is greater than a depth threshold. The depth threshold may be an assumed minimum of depth dimension of the vehicle. For a candidate object whose acquired depth dimension is equal to or less than the depth threshold, the road-sign additional value ΔL2 may be set greater than each of the vehicle additional value ΔL1 and the pedestrian additional value ΔL3.

In the present embodiment described above, the ECU 10 acquires, as detection information, a depth dimension of a candidate object, which is a dimension of a candidate object in the travel direction of the subject vehicle, and for a candidate object whose acquired depth dimension is greater than the predetermined depth threshold, sets the vehicle additional value ΔL1 greater than the vehicle additional value ΔL1 for a candidate object whose depth dimension is equal to or less than the depth threshold. This can inhibit a false determination that the subject vehicle and the road sign are the same object in a situation where the road sign is in proximity to the vehicle.

OTHER EMBODIMENTS (M1) The image-target types may include a manhole cover and the ECU 10 may be configured to identify the manhole cover. As in the case of the road sign, the ECU 10 may be configured to set, for a candidate object, among a plurality of candidate objects, whose amount of change in the received strength of the reflected wave is greater than a predetermined amount-of-change threshold, set the manhole-cover additional value higher than for a candidate object whose amount of change in the received strength of the reflected wave is equal to or less than the predetermined amount-of-change threshold. The ECU 10 may further be configured to set, for a candidate object, among the plurality of candidate objects, whose received strength is higher than a predetermined strength threshold, the manhole-cover additional value higher than for a candidate object whose received strength of the reflected wave is equal to or lower than the predetermined strength threshold. In the present embodiment, the manhole cover corresponds to a stationary object installed outside a predetermined height range assumed for the vehicle.

(M2) The ECU 10 may be configured to set a region having a second position for reference and having an X-axis width and a Y-axis width each given by an assumed error that is previously assumed based on the characteristics of the image sensor 22. Such a demarcated region may be set as an image search region A2.

(M3) When there are a plurality of candidate objects whose likelihood Li for the image-target type of the subject image target is higher than the likelihood threshold TH1, all of the candidate objects whose likelihood Li for the image-target type of the subject image target is higher than the likelihood threshold TH1 may be selected as objects to be subjected to same-object determination. In this case, if the answer is "YES" at step S18 in FIG. 7, the process flow may proceed to step S22. In this case, steps S19 and S21 may be deleted.

(M4) The ECU 10 may acquire the likelihood additional value ΔL using at least one of the absolute speed of the candidate object, the amount of change in the received strength of the reflected wave at the radar sensor 21, and the received strength from the candidate object at the radar sensor 21.

(M5) When there are a plurality of radar targets having a radar search region A1 that overlaps with an image search region A2, the ECU 10 may determine, for each of the plurality of radar targets, whether the likelihood Li is higher than a predetermined likelihood threshold TH1. In this case, it may be determined that the radar target whose likelihood Li for the image-target type of the image target is higher than the likelihood threshold TH1 and the image target are the same object.

(M6) Instead of ACC, the ECU 10 may perform collision mitigation control for mitigating a collision between the subject vehicle and an object located ahead of the subject vehicle. In this case, the ECU 10 may increase braking force of the braking device 32 when determining, based on the position of the fusion object, that the subject vehicle and the fusion object are likely to collide with each other.

(M7) The ECU 10 may be configured to determine that the radar target and the image target are the same object when the distance between the first position P1 of the radar target and the second position P2 of the image target is less than a predetermined determination distance.

(M8) The radar sensor 21 or the image sensor 22 may include a controller configured to perform same-object determination, where the controller included in the radar sensor 21 or the image sensor 22 may have the functions of the ECU 10.

(M9) In the above embodiments and modifications, the controller and the method thereof described in the present disclosure may be implemented by a special purpose computer which is configured with a memory and a processor programmed to execute one or more particular functions embodied in computer programs of the memory. Alternatively, the controller described in the present disclosure and the method thereof may be implemented by a dedicated computer configured as a processor with one or more dedicated hardware logic circuits. Alternatively, the control circuit and method described in the present disclosure may be implemented by one or more dedicated computers, which are configured as a combination of a memory and a processor programmed to perform one or more functions, and a processor which is configured with one or more hardware logic circuits. The computer program may also be stored on a computer readable non-transitory tangible storage medium as instructions to be executed by a computer.

The present disclosure is described in compliance with the embodiments. However, it should be appreciated that the present disclosure is not limited to the embodiments or the structures thereof. The present disclosure encompasses various modified examples and modifications within the range of equivalency. In addition, the scope of the present disclosure and the range of ideas thereof include various combinations and forms and other combinations and forms additionally including one or more elements or a portion of one element.

What is claimed is:

1. An object determination apparatus for identifying a candidate object amongst a plurality of candidate objects identified as the candidate object, the object determination apparatus performing a same-object determination on the candidate object by determining whether a subject image target detected by an image sensor and at least one subject radar target detected by an electromagnetic wave sensor and are the same object, the object determination apparatus installed on a subject vehicle, the electromagnetic wave sensor installed on the subject vehicle and configured to transmit and receive electromagnetic waves, the image sensor configured to capture images around the subject vehicle, the object determination apparatus comprising:

a non-transitory memory storing one or more computer programs; and a processor executing the one or more computer programs to:

identify an image-target type of the subject image target based on the image-target type output from the image sensor;

identify, among a plurality of radar targets, the at least one subject radar target as the candidate object for the same-object determination with the subject image target;

determine whether there is a plurality of candidate objects each identified as the candidate object for the same-object determination;

calculate, for each of the plurality of candidate objects, a likelihood that the respective candidate object is the image-target type of the subject image target based on detection information relating to each of the plurality of candidate objects;

determine whether at least one candidate object, among the plurality of candidate objects, has a likelihood for being the image-target type of the subject image target that is higher than a likelihood threshold; and select the at least one candidate object as the candidate object subjected to same-object determination, wherein the processor executes the one or more computer programs to acquire, based on detection information from the electromagnetic wave sensor, likelihood additional values that are additional values to be added to the respective likelihoods for the respective object types, and calculate the likelihoods for the respective object types, having the likelihood additional values added, the likelihood additional values for the respective object types differing depending on contents of the detection information from the electromagnetic wave sensor.

2. The object determination apparatus according to claim 1, wherein the object types comprise a vehicle, and a stationary object on a road, including a road sign, and the processor is configured to acquire, as the detection information, an absolute speed of each of the plurality of candidate objects, and set the likelihood additional value of being the vehicle for a candidate object, among the plurality of candidate objects, whose absolute speed is higher than a predetermined speed threshold, higher than for a candidate object whose absolute speed is equal to or less than the speed threshold.

3. The object determination apparatus according to claim 1, wherein the object types comprise a vehicle, and a stationary object installed outside a predetermined height range assumed for the vehicle, and the processor is configured to acquire, as the detection information, an amount of change in received strength of the reflected wave at the electromagnetic wave sensor when the subject vehicle is approaching the candidate object, and set the likelihood additional value of being the stationary object for a candidate object, among the plurality of candidate objects, whose amount of change in received strength is greater than a predetermined amount-of-change threshold, higher than for a candidate object whose amount of change in received strength is equal to or less than the amount-of-change threshold.

4. The object determination apparatus according to claim 1, wherein the object types comprise a vehicle and a road sign, and the processor is configured to acquire, as the detection information, a depth dimension which is a dimension of each candidate object in a travel direction of the subject vehicle, and set the vehicle additional value of being the vehicle for a candidate object, among the plurality of candidate objects, whose acquired depth dimension is greater than a predetermined depth threshold, higher than for a candidate object whose depth dimension is equal to or less than the depth threshold.

5. The object determination apparatus according to claim 1, wherein the object types comprise a vehicle and a pedestrian, and the processor is configured to acquire, as the detection information, a received strength of the reflected wave at the electromagnetic wave sensor, and set the likelihood additional value of being the vehicle for a candidate object, among the plurality of candidate objects, whose received strength is higher than a predetermined strength threshold, higher than for a candidate object whose received strength is equal to or lower than the received strength threshold.

6. The object determination apparatus according to claim 1, wherein the processor is configured to, in response to the object type of the image-target type of the subject image target to be subjected to same-object determination having been identified as the vehicle and there being a plurality of candidate objects whose likelihood of being the vehicle is higher than the likelihood threshold, select, from the plurality of candidate objects, a candidate object closest to the subject vehicle as a candidate object to be subjected to same-object determination by the same-object determiner.

7. The object determination apparatus according to claim 1, wherein the processor is configured to, in response to the object type of the image-target type of the subject image target to be subjected to same-object determination having been identified as the vehicle and there being a plurality of candidate objects whose likelihood of being the vehicle is higher than the likelihood threshold, select, from the plurality of candidate objects, a candidate object closest to the subject vehicle as a candidate object to be subjected to same-object determination by the same-object determiner.

8. The object determination apparatus according to claim 1, wherein the processor is configured to, in response to a distance from the subject vehicle to the subject image target being less than a predetermined nearby distance, select, regardless of the likelihood, a candidate object closest to the subject vehicle from the plurality of candidate objects as a candidate object be subjected to same-object determination by the same-object determiner.

9. The object determination apparatus according to claim 1, wherein
the processor is configured to perform the same-object determination on the candidate object, based on a presence or an absence of an overlap between a first search region based on a position of the respective candidate object detected by the electromagnetic wave sensor and a second search region based on a position of the respective candidate object detected by the image sensor.

10. An object determination method for identifying a candidate object amongst a plurality of candidate objects identified as the candidate object on which to perform a same-object determination by determining whether a subject image target detected by an image sensor and at least one subject radar target detected by an electromagnetic wave sensor and are the same object, the electromagnetic wave sensor installed on a subject vehicle and configured to transmit and receive electromagnetic waves, the image sensor configured to capture images around the subject vehicle, the object determination method comprising:
identifying an image-target type of the subject image target based on the image-target type output from the image sensor;
identifying, among a plurality of radar targets, the at least one subject radar target as the candidate object for the same-object determination with the subject image target;
determining whether there is a plurality of candidate objects each identified as the candidate object for the same-object determination;
calculating, for each of the plurality of candidate objects, a likelihood that the respective candidate object is the image-target type of the subject image target based on detection information relating to each of the plurality of candidate objects;
determining whether at least one candidate object, among the plurality of candidate objects, has a likelihood for being the image-target type of the subject image target that is higher than a likelihood threshold; and
selecting the at least one candidate object as the candidate object subjected to same-object determination, wherein
likelihood additional values are acquired based on detection information from the electromagnetic wave sensor, the likelihood additional values being additional values to be added to the respective likelihoods for the respective object types, and the likelihoods for the respective object types are calculated, having the likelihood additional values added, the likelihood additional values for the respective object types differing depending on contents of the detection information from the electromagnetic wave sensor.

* * * * *